United States Patent
Huang

(10) Patent No.: US 10,042,769 B2
(45) Date of Patent: Aug. 7, 2018

(54) SYSTEM AND METHOD FOR MANAGING CACHE SPACE AND ELECTRONIC DEVICE EMPLOYING SAME

(71) Applicant: NANNING FUGUI PRECISION INDUSTRIAL CO., LTD., Nanning (CN)

(72) Inventor: Yi-Sheng Huang, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 218 days.

(21) Appl. No.: 15/075,706

(22) Filed: Mar. 21, 2016

(65) Prior Publication Data
US 2017/0212838 A1 Jul. 27, 2017

(51) Int. Cl.
| | | |
|---|---|---|
| G06F 3/00 | (2006.01) | |
| G06F 13/00 | (2006.01) | |
| G06F 13/28 | (2006.01) | |
| G06F 12/0871 | (2016.01) | |
| G06F 13/40 | (2006.01) | |
| G06F 11/30 | (2006.01) | |
| G06F 11/22 | (2006.01) | |

(52) U.S. Cl.
CPC ...... *G06F 12/0871* (2013.01); *G06F 11/2289* (2013.01); *G06F 11/3051* (2013.01); *G06F 13/4018* (2013.01); *G06F 13/4022* (2013.01); *G06F 2212/604* (2013.01)

(58) Field of Classification Search
CPC .......... G06F 2212/601; G06F 12/0871; G06F 12/084; G06F 12/0866; G06F 2212/6042; G06F 12/0868

USPC ............ 711/E12.019, 113, 170, 130; 710/16
See application file for complete search history.

(56) References Cited

U.S. PATENT DOCUMENTS

| | | | | |
|---|---|---|---|---|
| 8,395,634 B2 * | 3/2013 | Ando | ............... | H04N 19/63 345/545 |
| 9,208,093 B2 * | 12/2015 | Conte | ............... | G06F 9/3804 |
| 2004/0215875 A1 * | 10/2004 | Matsuba | ............ | G06F 12/0873 711/113 |
| 2005/0071599 A1 * | 3/2005 | Modha | ............... | G06F 9/5016 711/170 |
| 2010/0083120 A1 * | 4/2010 | Ito | ............... | G06F 3/061 715/735 |
| 2010/0318744 A1 * | 12/2010 | Benhase | ............ | G06F 12/0868 711/136 |
| 2011/0047333 A1 * | 2/2011 | Wolfe | ............... | G06F 12/084 711/125 |

(Continued)

FOREIGN PATENT DOCUMENTS

TW 200917039 A 1/2014

*Primary Examiner* — Faisal M Zaman
(74) *Attorney, Agent, or Firm* — ScienBiziP, P.C.

(57) ABSTRACT

A method for managing cache space between one electronic device and multiple storage devices includes identifying and quantifying storage devices connected to an electronic device, and acquiring efficiency information of each identified storage device on preset occasions. Cache space of each storage device is computed on being connected to or being disconnected from the electronic device, taking account of information acquired as to efficiency and quantity of each of the storage devices. A core switch of the electronic device is controlled to allocate a computed cache space to a storage device.

19 Claims, 3 Drawing Sheets

(56) References Cited

U.S. PATENT DOCUMENTS

| | | | |
|---|---|---|---|
| 2012/0210066 A1* | 8/2012 | Joshi | G06F 12/0866 711/118 |
| 2013/0091319 A1* | 4/2013 | Cho | G06F 11/3485 711/103 |
| 2013/0318196 A1* | 11/2013 | Yamamoto | G06F 12/0871 709/215 |
| 2014/0040556 A1* | 2/2014 | Walker | G06F 9/5016 711/130 |
| 2016/0019156 A1* | 1/2016 | Feldman | G06F 12/0871 711/129 |
| 2017/0031822 A1* | 2/2017 | Ma | G06F 12/0811 |
| 2017/0212842 A1* | 7/2017 | Khosrowpour | G06F 12/0893 |
| 2017/0364447 A1* | 12/2017 | Nazarov | G06F 3/0611 |

\* cited by examiner

SYSTEM AND METHOD FOR MANAGING CACHE SPACE AND ELECTRONIC DEVICE EMPLOYING SAME

CROSS-REFERENCE TO RELATED APPLICATIONS

This application claims priority to Taiwanese Patent Application No. 105102386 filed on Jan. 26, 2016, the contents of which are incorporated by reference herein.

FIELD

The subject matter herein generally relates to cache management in a computer, and especially relates to a system and a method for managing cache space and an electronic device employing the same.

BACKGROUND

Electronic devices, such as a tablet computer, can communicate with storage device of Serial ATA Advanced Host Controller Interface (AHCI) or storage device of Non Volatile Memory Express (NVME) via the PCI-Express. However, an electronic device with the PCI-Express protocol fails to identify the type of the storage device, thus the electronic device with the PCI-Express is not able to distribute cache space to other storage devices communicating with the electronic device, based on the different types of the other storage devices.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
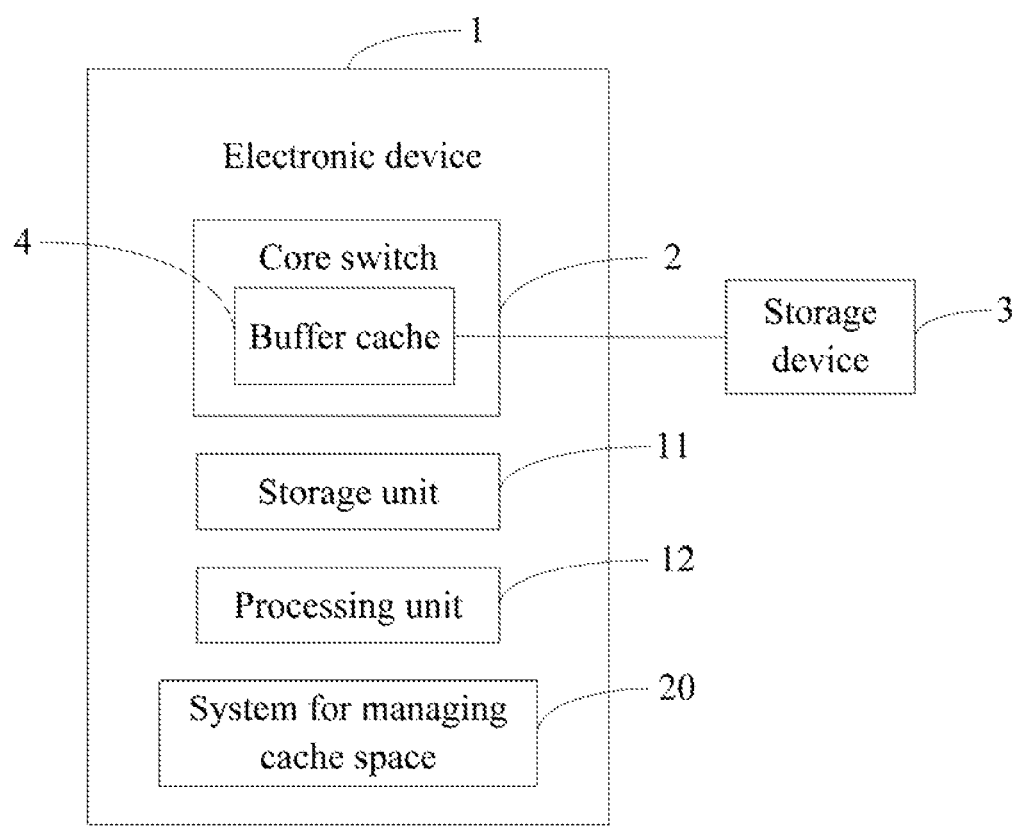
FIG. 1 is a block diagram of one embodiment of a running environment of a system for managing cache space.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

FIG. 1 illustrates one embodiment of a running environment of a system 20 for managing cache space. The system 20 runs on an electronic device 1, and is used for managing cache space of an electronic device 1. In at least one embodiment, the electronic device 1 can be a computer, a server, or other suitable terminal device. The electronic device 1 includes, but is not limited to, a core switch 2, a storage unit 11, at least one processing unit 12, and the system 20. The electronic device 1 can connect to at least one storage device 3 through the core switch 2. In one embodiment, the electronic device 1 connects to the core switch 2 via the PCI-Express, and the core switch 2 connects to the storage device 3 via the PCI-Express. The core switch 2 includes a buffer cache 4. The buffer cache 4 defines a fixed capacity cache space. The buffer cache 4 is used to temporarily store exchangeable data between the electronic device 1 and the storage device 3. The core switch 2 is used to distribute cache space of the buffer cache 4 to the storage device 3 connected to the core switch 2. In at least one embodiment, the storage device 3 can be an AHCI storage device or an NVME device.

In at least one embodiment, the storage unit 11 can include various types of non-transitory computer-readable storage mediums. For example, the storage unit 11 can be an internal storage system, such as a flash memory, a random access memory (RAM) for temporary storage of information, and/or a read-only memory (ROM) for permanent storage of information. The storage unit 11 can also be an external storage system, such as a hard disk, a storage card, or a data storage medium. The at least one processing unit 12 can be a central processing unit (CPU), a microprocessor, or other data processor chip that performs functions of the system 20.

Figure 2:
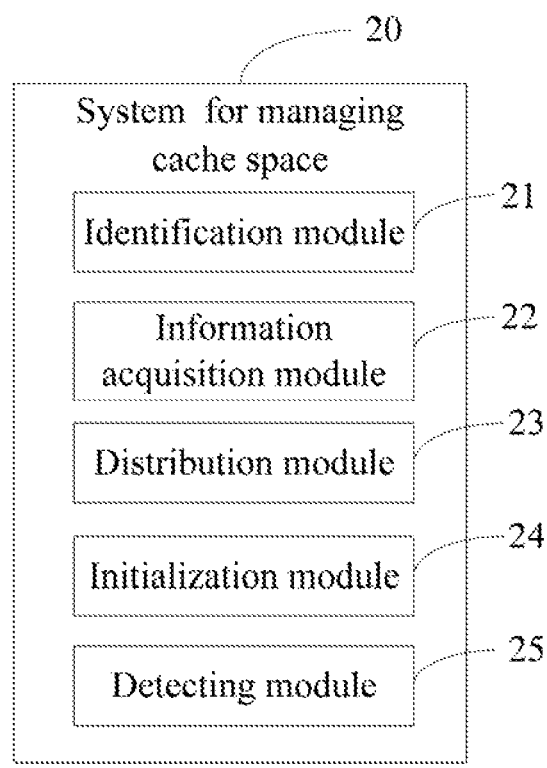
FIG. 2 is a block diagram of one embodiment of a system for managing cache space.

FIG. 2 illustrates one embodiment of an system 20 for managing cache space. In at least one embodiment, the system 20 can include an identification module 21, an information acquisition module 22, a distribution module 23, an initialization module 24, and a detecting module 25. The modules 21-25 of the system 20 can be collections of software instructions stored in the storage unit 11 of the electronic device 1 and executed by the processing unit 12 of the electronic device 1. The modules 21-25 of the system 20 also can present functionality in the form of hardware or integrated circuits, or as software and hardware combinations, such as a special-purpose processor or a general-purpose processor with special-purpose firmware.

The identification module 21 is used to identify the storage devices 3 connected to the electronic device 1. In at least one embodiment, the identification module 21 is able to obtain and analyze information as to the identity and type of the storage devices 3. In one embodiment, the storage device 3 stores a class code and a sub-class code. The class code includes the identification information of the storage device 3. The sub-class code includes the type information of the storage device 3. The identification module 21 identifies the identification information of the storage device 3 by reading class code and identifies the type information of the storage device 3 by reading sub-class code. In at least one embodiment, the type information of the storage device 3 can include AHCI type-information and NVME type-information.

The information acquisition module 22 is used to acquire a quantity of the storage devices 3 after identification by the identification module 21 and also efficiency information of each identified storage device 3 on or more preset occasions. The efficiency information includes bus width of the storage device 3, transmission speed of the storage device 3, and number of instructions which can be executed by the storage device 3.

In at least one embodiment, the information acquisition module 22 acquires efficiency information of the storage device 3 as follows. The information acquisition module 22 reads the bus width of the storage device 3, the transmission speed of the storage device 3, and the number of instructions which can be executed by the storage device 3 according to a predetermined schedule. The information acquisition module 22 computes an average bus width value, an average transmission speed value, and an average number of instructions which can be executed during a preset occasion. The readings in accordance with the predetermined schedule are more frequent than the readings of the preset occasions.

In another embodiment, the information acquisition module 22 reads the bus width of the storage device 3, the transmission speed of the storage device 3, and the number of instructions executable by the storage device 3 on a preset occasion and regards the bus width value, the transmission speed value, and the number of instructions executable so read as the efficiency information of the storage device 3.

The distribution module 23 is used to compute the cache space of each storage device 3 according to the efficiency information and quantity of the storage devices 3. The distribution module 23 further controls the core switch 2 to distribute or allocate the computed cache space to the corresponding storage device 3.

In at least one embodiment, the distribution module 23 computes the cache space of each storage device 3 according to a formula $$B_n = \frac{Q_n \cdot W_n \cdot V_n}{\sum_{n=1}^{n} Q_n \cdot W_n \cdot V_n} \cdot A (n = 1, 2 \cdots).$$

Wherein n is the quantity of the storage devices 3, $Q_n$ is the number of the instructions which can be executed by the nth storage device 3, $W_n$ is the bus width value of the nth storage device 3, and $W_n$ is the transmission speed of the nth storage device 3. Further, A is the fixed capacity cache space defined by the buffer cache 4 of the core switch 2 and $B_n$ is the computed cache space of the nth storage device 3.

After the identification module 21 obtains the type information of storage device 3, the initialization module 24 allocates a given capacity of cache space to the storage device 3 according to the type information of the storage device 3. Thus, the electronic device 1 is able to allocate a given data capacity of cache space to the storage device 3 according to the type information of the storage device 3, so as to then make the electronic device 1 exchange data with the storage device 1. For example, when the storage device 3 is an AHCI storage device, the initialization module 24 allocates a first default capacity of cache space to the storage device 3; when the storage device 3 is an NVME storage device, the initialization module 24 distributes a second default capacity of cache space to the storage device 3.

The detecting module 25 detects whether a new storage device 3 is connected to, or an old storage device 3 is disconnected from, the electronic device 1 via the core switch 2. When the detecting module 25 detects the connection of a new storage device 3 to the electronic device 1, the identification module 21 identifies the new storage device 3. The information acquisition module 22 acquires efficiency information of each storage device 3 connected to the electronic device 1 and quantity of the storage devices 3 connected to the electronic device 1 on preset occasions. The distribution module 23 computes the cache space of each storage device 3 connected to the electronic device 1 according to information acquired as to efficiency and quantity of the storage devices 3, and controls the core switch 2 to allocate the computed cache space to the one or more storage devices 3 connected to the electronic device 1.

When the detecting module 25 detects that a storage device 3 is disconnected from the electronic device 1, the detecting module 25 releases the allocated cache space of the disconnected storage device 3. The information acquisition module 22 acquires efficiency information of each storage device 3 still connected to the electronic device 1 and quantity of the remaining storage devices 3 still connected to the electronic device 1 on a preset occasion. The distribution module 23 computes the cache space of the remaining storage devices 3 still connected to the electronic device 1 according to the acquired information as to efficiency and quantity and controls the core switch 2 to allocate or re-allocate the computed cache space to the remaining storage devices 3 still connected to the electronic device 1.

Figure 3:
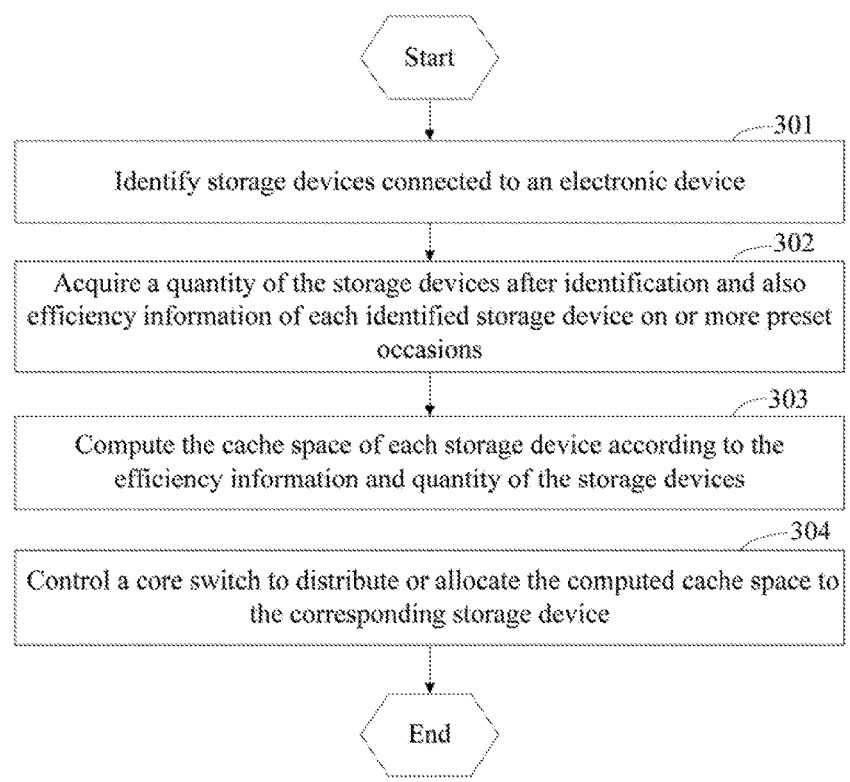
FIG. 3 illustrates a flowchart of one embodiment of a method for managing cache space.

FIG. 3 illustrates a flowchart of a method for managing cache space. The method is provided by way of example, as there are a variety of ways to carry out the method. The method described below can be carried out using the configurations illustrated in FIG. 1-2, for example, and various elements of these figures are referenced in explaining the example method. Each block shown in FIG. 3 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 301.

At block 301, an identification module identifies storage devices connected to an electronic device. In at least one embodiment, the identification module is able to obtain and analyze information as to the identity and type of the storage devices.

At block 302, an information acquisition module acquires a quantity of the storage devices after identification by the identification module and also efficiency information of each identified storage device on or more preset occasions. Wherein, the efficiency information includes bus width of the storage device, transmission speed of the storage device, and number of instructions which can be executed by the storage device.

At block 303, a distribution module computes the cache space of each storage device according to the efficiency information and the quantity of the storage devices. In at least one embodiment, the distribution module computes the cache space of each storage device according to a formula $$B_n = \frac{Q_n \cdot W_n \cdot V_n}{\sum_{n=1}^{n} Q_n \cdot W_n \cdot V_n} \cdot A (n = 1, 2 \cdots).$$

Wherein n is the quantity of the storage devices, $Q_n$ is the number of the instructions which can be executed by the nth storage device, $W_n$ is the bus width value of the nth storage device, and $W_n$ is the transmission speed of the nth storage device. Further, A is the fixed capacity cache space defined by a buffer cache of a core switch and $B_n$ is the computed cache space of the nth storage device.

At block 304, the distribution module further controls the core switch to distribute or allocate the computed cache space to the corresponding storage device.

In the embodiment, the method further includes:
a detecting module detects whether a new storage device is connected to the electronic device;
when a new storage device is connected to the electronic device, the identification module identifies the new storage device, the information acquisition module acquires efficiency information of each storage device connected to the electronic device and quantity of the storage devices connected to the electronic device on preset occasions; and
the distribution module computes the cache space of each storage device connected to the electronic device according to information acquired as to efficiency and quantity of the storage devices, and the distribution module controls the core switch to allocate the computed cache space to the one or more storage devices connected to the electronic device.

In the embodiment, the method further includes:
the detecting module detects whether an old storage device is disconnected from the electronic device;
when an old storage device is disconnected from the electronic device, the detecting module releases the allocated cache space of the disconnected storage device, and the information acquisition module acquires efficiency information of each storage device still connected to the electronic device and quantity of the remaining storage devices still connected to the electronic device on a preset occasion; and
the distribution module computes the cache space of the remaining storage devices still connected to the electronic device according to the acquired information as to efficiency and quantity, and controls the core switch to allocate or re-allocate the computed cache space to the remaining storage devices still connected to the electronic device.

In the embodiment, the method further includes: the identification module obtains the type information of the storage device, and the initialization module allocates a given capacity of cache space to the storage device according to the obtained type information of the storage device.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An electronic device for managing cache space comprising:
   a core switch comprising a buffer cache, the core switch configured to distribute cache space of the buffer cache to storage devices connected to the electronic device;
   at least one processing unit coupled to the core switch; and
   a non-transitory storage medium coupled to the at least one processing unit and configured to store a plurality of instructions, which cause the electronic device to:
   identify the storage devices connected to the electronic device;
   acquire a quantity of the storage devices after identification and efficiency information of each identified storage device on one or more preset occasions, wherein, the efficiency information comprises bus width of the storage devices, transmission speed of the storage devices, and number of instructions which can be executed by the storage devices;
   compute the cache space of each storage device according to the efficiency information and the quantity of the storage devices; and
   control the core switch to distribute or allocate the computed cache space to the storage devices.

2. The electronic device as recited in claim 1, wherein the plurality of instructions is further configured to cause the device to:
   compute the cache space of each storage device according to a formula $$B_n = \frac{Q_n \cdot W_n \cdot V_n}{\sum_{n=1}^{n} Q_n \cdot W_n \cdot V_n} \cdot A (n = 1, 2 \cdots),$$

Wherein n is the quantity of the storage devices, $Q_n$ is the number of the instructions which can be executed by the nth storage device, $W_n$ the bus width value of the nth storage device, $V_n$ is the transmission speed of the nth storage device, A is the fixed capacity cache space defined by the buffer cache of the core switch and $B_n$ is the computed cache space of the nth storage device.

3. The electronic device as recited in claim 1, wherein the plurality of instructions is further configured to cause the device to:
   obtain and analyze information as to the identity and type of the storage devices.

4. The electronic device as recited in claim 3, wherein the plurality of instructions is further configured to cause the device to:
   allocate a given capacity of cache space to the storage devices according to the obtained type information of the storage devices to make the electronic device exchange data with the storage devices.

5. The electronic device as recited in claim 1, wherein the plurality of instructions is further configured to cause the device to:
   detect whether an old storage device is disconnected from the electronic device; and when the old storage device being disconnected from the electronic device, release the allocated cache space of the disconnected storage device.

6. The electronic device as recited in claim 5, wherein the plurality of instructions is further configured to cause the device to:

detect whether a new storage device is connected to the electronic device; and when the new storage device being connected to the electronic device, identify the new storage device.

7. The electronic device as recited in claim 1, wherein the storage device can be an AHCI storage device or an NVME device.

8. A system for managing cache space, run in an electronic device, the system comprising:

at least one processor; and a plurality of modules which are collections of instructions executable by the processor, the plurality of modules comprising:

an identification module configured to, upon execution by the at least one processor, cause the at least one processor to identify storage devices connected to the electronic device;

an information acquisition module configured to, upon execution by the at least one processor, cause the at least one processor to acquire a quantity of the storage devices after identification and efficiency information of each identified storage device on one or more preset occasions, wherein, the efficiency information comprises bus width of the storage devices, transmission speed of the storage devices, and number of instructions which can be executed by the storage devices; and a distribution module configured to, upon execution by the at least one processor, cause the at least one processor to compute cache space of each storage device according to the efficiency information and the quantity of the storage devices, and control a core switch to distribute or allocate the computed cache space to the storage devices.

9. The system as recited in claim 8, wherein the distribution module is further configured to, upon execution by the at least one processor, cause the at least one processor to compute the cache space of each storage device according to a formula $$B_n = \frac{Q_n \cdot W_n \cdot V_n}{\sum_{n=1}^{n} Q_n \cdot W_n \cdot V_n} \cdot A (n = 1, 2 \cdots),$$

Wherein n is the quantity of the storage devices, $Q_n$ is the number of the instructions which can be executed by the nth storage device, $W_n$ is the bus width value of the nth storage device, $V_n$ is the transmission speed of the nth storage device, A is the fixed capacity cache space defined by a buffer cache of the core switch and $B_n$ is the computed cache space of the nth storage device.

10. The system as recited in claim 8, wherein the identification module is configured to obtain and analyze information as to the identity and type of the storage devices.

11. The system as recited in claim 8, wherein the plurality of modules further comprise:

an initialization module configured to, upon execution by the at least one processor, cause the at least one processor to allocate a given capacity of cache space to the storage devices according to the type information of the storage devices obtained by the identification module to make the electronic device exchange data with the storage devices.

12. The system as recited in claim 8, wherein the plurality of modules further comprise:

a detecting module configured to, upon execution by the at least one processor, cause the at least one processor to detect whether an old storage device is disconnected from the electronic device; and when the old storage device being disconnected from the electronic device, release the allocated cache space of the disconnected storage device.

13. The system as recited in claim 12, wherein the detecting module is further configured to detect whether a new storage device is connected to the electronic device; and when the new storage device being connected to the electronic device, identify the new storage device.

14. A method for managing cache space comprising:

identifying storage devices connected to the electronic device;

acquiring a quantity of the storage devices after identification and efficiency information of each identified storage device on one or more preset occasions, wherein, the efficiency information comprises bus width of the storage devices, transmission speed of the storage devices, and number of instructions which can be executed by the storage devices;

computing the cache space of each storage device according to the efficiency information and the quantity of the storage devices; and controlling a core switch to distribute or allocate the computed cache space to the storage devices.

15. The method as recited in claim 14, wherein the method further comprising:

computing the cache space of each storage device according to a formula $$B_n = \frac{Q_n \cdot W_n \cdot V_n}{\sum_{n=1}^{n} Q_n \cdot W_n \cdot V_n} \cdot A (n = 1, 2 \cdots),$$

Wherein n is the quantity of the storage devices, $Q_n$ is the number of the instructions which can be executed by the nth storage device, $W_n$ is the bus width value of the nth storage device, $V_n$ is the transmission speed of the nth storage device, A is the fixed capacity cache space defined by a buffer cache of the core switch and $B_n$ is the computed cache space of the nth storage device.

16. The method as recited in claim 14, wherein the method further comprising:

obtaining and analyzing information as to the identity and type of the storage devices.

17. The method as recited in claim 16, wherein the method further comprising:

allocating a given capacity of cache space to the storage devices according to the obtained type information of the storage devices to make the electronic device exchange data with the storage devices;

identifying type information of the storage devices; and distributing a given capacity of cache space to the storage devices according to the type information of the storage devices.

18. The method as recited in claim 14, wherein the method further comprising:

detecting whether an old storage device is disconnected from the electronic device; and when the old storage device being disconnected from the electronic device, releasing the allocated cache space of the disconnected storage device.

19. The method as recited in claim 18, wherein the method further comprising:

detecting whether a new storage device is connected to the electronic device; and when the new storage device being connected to the electronic device, identifying the new storage device.

* * * * *